July 12, 1932. B. B. GREER 1,866,644
HOSE FITTING FOR AIR BRAKES
Filed Jan. 30, 1931
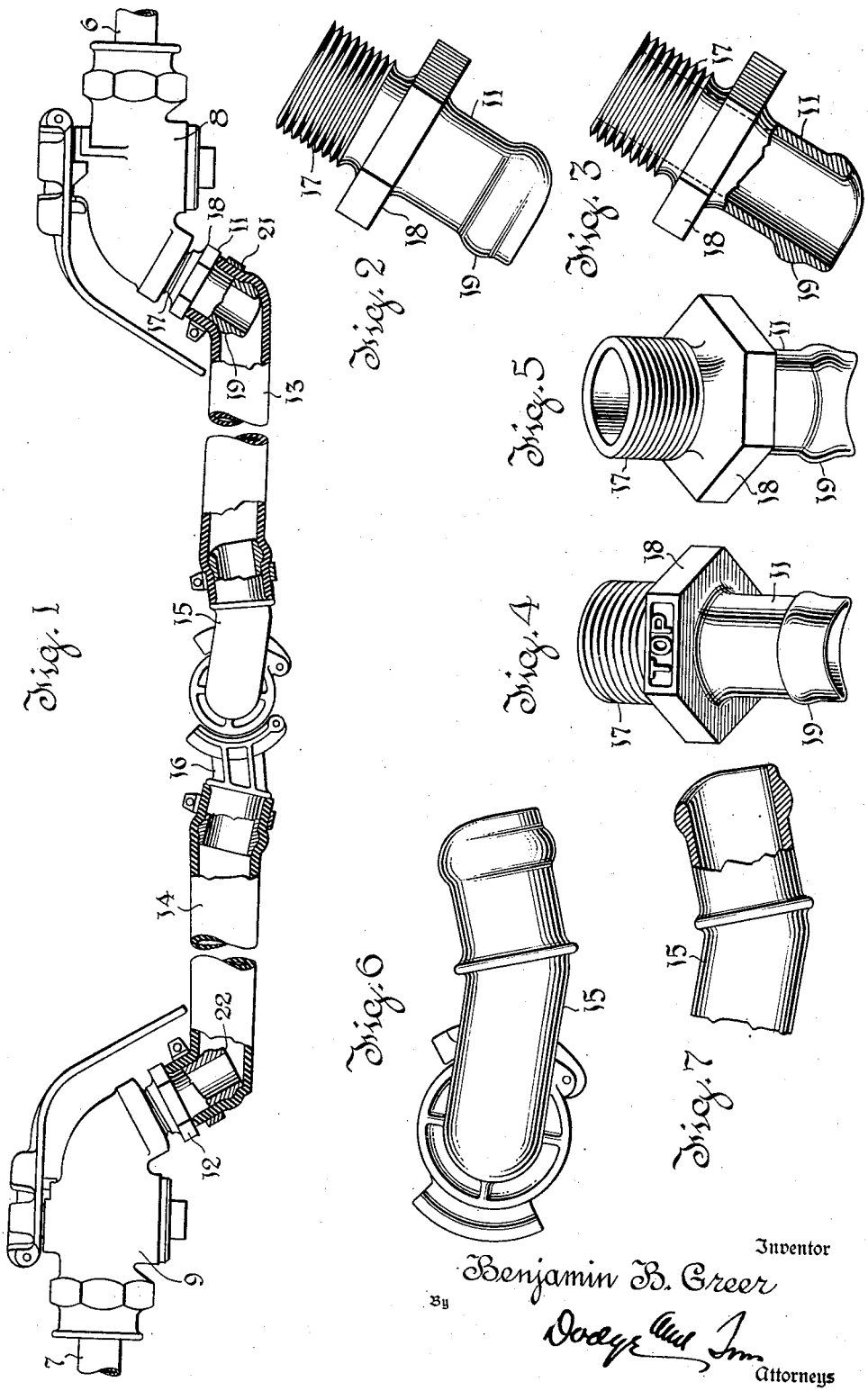
Inventor
Benjamin B. Greer
By
Dodge
Attorneys Patented July 12, 1932

1,866,644

UNITED STATES PATENT OFFICE

BENJAMIN B. GREER, OF NEW CANAAN, CONNECTICUT

HOSE FITTING FOR AIR BRAKES

Application filed January 30, 1931. Serial No. 512,464.

This invention relates to air brake hose fittings, and particularly to the nipples which serve to connect the hose to the angle cock or fitting, and the hose coupler.

In separating cars whose brake systems are charged, the approved practice is first to close the angle cocks. Then the operator grasps the couplings and imparts a twisting action to exhaust the air that has become trapped in the hose. He may then manually separate the couplings. Where the coupler gaskets form a tight seal, however, the air is not always exhausted as intended, and upon separation of the couplings, the trapped air pressure is sufficient to blow the couplings from the operator's hands, often resulting in serious injury to him.

To avoid such possible injury, the operators have resorted to the practice of pulling the couplings apart by the separation of the cars. This subjects the hose to severe stresses. For instance, it has been found by actual test that the pulling stress required to separate two standard hose couplings charged to a pressure of 110 pounds may be as high as 500 pounds.

Frequent failures or breaking down of the hose at the point where it is pulled against the sharp lower edge of the standard hose nipple have resulted.

The object of the type of nipple here presented is to distribute the strain encountered at this point over a large smooth area, thereby minimizing the likelihood of such hose failure.

In the drawing:—

Fig. 1 is an elevation, partly in section, of a portion of a fluid pressure brake system showing on the brake pipe to the right an air hose installation embodying the improved hose nipple and coupling, and on the left hand brake pipe a similar installation employing the standard nipple and hose coupling, the parts being in the position they assume during a separation of cars;

Fig. 2 is an elevation of the improved form of hose nipple;

Fig. 3 is a similar view being partly broken away and in section;

Fig. 4 is a view of the top face of the nipple;

Fig. 5 shows the nipple as viewed from the opposite side from Fig. 4;

Fig. 6 is a side elevation of a standard form of hose coupling having its nipple formed in conformity with this invention; and Fig. 7 is a fragmentary view of the nipple portion of a hose coupling, partly broken away and in section.

The form of nipple here presented is intended for use where the attached hose is liable to stress in only one general direction, as under the conditions which have been outlined. It is, therefore, possible definitely to localize the area on the nipple at which this stress will occur. The entire absence of any extension beyond the bead of the nipple by which the end of the hose might be initially engaged, would render it extremely difficult to force the hose end past the bead and would, therefore, be undesirable. I have discovered, however, that the partial elimination of such extension leaves a sufficiently large rounded surface against which the hose is pulled, while the remaining extension, subtending two-thirds to three-fourths of the circumference, is sufficient to engage the hose end and guide it over the bead as in the present standard nipple.

Referring to Fig. 1, which illustrates a portion of a fluid pressure brake system, the numerals 6 and 7 designate the brake pipes of two railway cars which are connected in the usual manner by means of the angle cocks 8 and 9, air hose nipples 11 and 12, air hose 13 and 14, and the hose couplers 15 and 16. The several parts are all shown in the position they assume upon being stressed during the separation of the cars.

The body of the air hose nipple, as shown most clearly in Figs. 2 and 3, is substantially tubular in form and one end 17 is threaded so that it may be screwed into the body of the angle cock. The nipple is provided with an enlarged hexagonal nut portion 18 to which a wrench may be applied when attaching and removing it.

To insure accurate positioning of the nipple when installed, that face of the hexagonal enlargement diametrically opposite the rounded end portion has the word "Top" cast in it. This should be uppermost when the nipple is screwed into the angle cock.

Spaced inwardly from the outer end of the nipple is the usual rounded bead 19, over which the air hose 13 is forced, thereby effecting a tight seal at this point. The hose is held securely in place by the usual clamp ring 21, behind the bead.

As thus far described, the form is identical with that of the usual hose nipple, however, as shown at 22 in Fig. 1, the end of the standard nipple presents a sharp edged extension around its entire circumference beyond the bead. It is this sharp edge that damages the hose.

To avoid this, the rim or portion of the nipple which extends beyond the bead 19 is cut back or indented along a portion of its circumference, and is then finished off so that this forms a smooth and continuously curving surface gradually merging into, and of approximately the same radius as that of the outer surface of the bead 19. This edge is always the lower one when the nipple is installed for use on the angle cock, and the upper one in the coupling, as shown. Because of the standardized installation of the angle cocks and couplings relatively to the hose, it is thus possible to locate the rounded surfaces so that they offer the desired protection.

With such nipples, properly installed, a relatively large smooth surface is presented over which the stress is distributed when the hose is pulled against this edge of the nipple. This materially reduces the probability of hose failures at this point.

In Figs. 6 and 7, the application of my invention to the nipple of a hose coupler is shown. The location of the rounded portion must be at the top, i. e. in the side toward the re-entrant angle between the axis of the nipple and the axis of the coupler.

While I have illustrated and described a specific application of my invention, it is to be understood that it may be used in any case where the hose is stressed when deflected, always in the same general direction relatively to the axis of the nipple.

What is claimed is:—

1. A hose nipple having a circumferential bead, and a lip or extension beyond said bead, the lip and bead being so coordinated that the lip embraces less than the entire circumference of the nipple, and the bead presents a rounded surface merging into the end of the nipple in that portion not embraced by the lip.

2. A hose nipple having a circumferential bead spaced from the outer end thereof, the regular continuity of said end being interrupted for a portion of its circumference, said interruption providing a curved surface merging with and forming a continuation of the surface of said bead.

3. A hose nipple having a circumferential bead spaced from the outer end thereof, said end being indented for a portion of its circumference, said indented portion being curved and merging with the curved surface of said bead to form a continuation thereof.

4. A hose nipple having a bead portion at one end, said end having an extension beyond said bead for a portion only of its circumference.

5. A hose nipple having a bead portion at one end, said end having an extension beyond said bead for a portion only of its circumference, and said extension gradually merging into said bead and disappearing throughout the remainder of the circumference.

6. The combination of a hose coupling; a hose attaching nipple rigidly mounted on said coupling and extending obliquely to the longitudinal axis of the coupling, said nipple having a circumferential bead and an extension beyond said bead, said extension embracing only a portion of the circumference of the bead and disappearing by mergence into the bead through the remainder of the circumference, the parts being so arranged that when the coupling is drawn in the direction of its axis a hose attached over said nipple is flexed into contact with said bead in the area devoid of said extension.

In testimony whereof I have signed my name to this specification.

BENJAMIN B. GREER.